United States Patent [19]

Giddings et al.

[11] Patent Number: 5,422,544
[45] Date of Patent: Jun. 6, 1995

[54] LIGHTING CONTROLLER WITH COMPENSATION FOR EYE ADAPTABILITY CHARACTERISTICS

[75] Inventors: Richard V. Giddings, Lester Prairie; Stephen V. Metz, St. Paul, both of Minn.

[73] Assignee: Honeywell Inc., Minneapolis, Minn.

[21] Appl. No.: 6,109

[22] Filed: Jan. 15, 1993

[51] Int. Cl.⁶ .............................. H05B 37/02
[52] U.S. Cl. ........................ 315/156; 315/151; 315/158; 315/DIG. 4
[58] Field of Search ............ 315/156, 151, 158, 77, 315/294, 324, DIG. 4

[56] References Cited

U.S. PATENT DOCUMENTS

| | | | |
|---|---|---|---|
| 2,882,450 | 11/1959 | McCabe | 315/151 |
| 4,636,774 | 1/1987 | Galvin et al. | 340/565 |
| 5,015,924 | 5/1991 | Berman et al. | 315/324 |
| 5,143,437 | 9/1992 | Matsuno et al. | 315/156 X |

*Primary Examiner*—Robert J. Pascal
*Assistant Examiner*—Haissa Philogene
*Attorney, Agent, or Firm*—Charles L. Rubow

[57] ABSTRACT

Light control apparatus and method in which commanded changes in luminance in a space are executed in accordance with a rate function generated by a function generator to correspond to adaptability of the human eye to changes in luminance. A luminance sensor detects the luminance to which a person occupying the space was exposed just prior to the commanded change in luminance. The sensed luminance is used to determine the discrimination range of the occupant, and, upon a commanded increase in luminance in the space, the luminance is immediately increased to within the range.

18 Claims, 6 Drawing Sheets

LIGHTING CONTROLLER WITH COMPENSATION FOR EYE ADAPTABILITY CHARACTERISTICS

BACKGROUND OF THE INVENTION

The invention disclosed herein relates generally to lighting control apparatus and methods, and more particularly to lighting controls which provide nonabrupt changes in luminance to achieve eye comfort and speed eye adaptation to different illumination intensities.

It is well known that rapid changes in lighting intensity affect comfort and ability to see. For example, turning on a bright bathroom light during the night or going from a dark restaurant or bar into the bright outdoor sun causes considerable temporary eye discomfort. Ability to see is also temporarily impaired.

Similarly, when passing from a brightly lit area into a dark place, ability to see is impaired for a longer time. For example, when entering a dark movie theater, it may be difficult at first even to see which seats are empty. However, after a few minutes the surroundings can be seen quite well.

The foregoing phenomenon is described, explored and analyzed in detail in numerous references, of which the following are representative examples.

Baker, H. D., "Initial Stages of Dark and Light Adaptation", *Journal of the optical society of America*, 53(1), 1963, pp. 98–103.

Baker, H. D., "Some Direct Comparisons Between Light and Dark Adaptation", *Journal of the Optical Society of America*, 45(10), 1955, pp. 839–844.

Baker, H. D., "The Course of Foveal Light Adaptation Measured by the Threshold Intensity Increment", *Journal of the Optical Society of America*, 39(2), 1949, pp. 172–179.

Boyce, P. R., *Human Factors in Lighting*. New York: MacMillan, 1981.

Brown, K. T., "Physiology of the Retina", *Medical Physiology*, C.V. Mosby Co., 1974.

Hopkinson, R. G. and Collins, J. B., *The Ergonomics of Lighting*, MacDonald & Co., 1970.

Luckiesh, M., *The Science of Seeing*, Van Nostrand, 1973.

Records, R.E., *Physiology of the Human Eye and visual System*, Harper & Row, 1977, pp. 368–372.

As described in these references, the actual process of eye adaptation to changes in illumination intensity has three components. The first component is characterized by a rapid adjustment, and presumably involves neural mechanisms. A second component characterized by medium time adjustment involves change in pupil size. A third component characterized by relatively slow adjustment is governed by the rates of photochemical processes at the cones and rods of the retina.

The overal rate of adaptation is governed by the slow photochemical phase, the actual time taken depending on the starting and final luminances. This is because the adaptation processes for rods and cones have different time constants, on the order of two minutes for cones and seven to eight minutes for rods. In general, when both starting and final luminances are in the photopic range, adaptation is relatively rapid. The adaptation time is typically a few minutes because only the cones are involved.

When the starting luminance is in the photopic range and the final luminance is in the scotopic range, a much longer two stage process occurs. The first stage involves the cones and the second stage involves the rods. Complete adaptation to darkness from a high photopic luminance can take up to an hour.

When both starting and final luminances are in the scotopic range, then only the rods are involved and adaptation is fairly rapid, typically on the order of several minutes.

Thus, it is apparent that benefits can be in the areas of eye comfort and improved seeing can be achieved by avoiding rapid changes in illumination intensity.

A variety of lighting control techniques and systems which provide for dimming or fading are alos well known. These range from simple, manually controlled dimmers implemented with variable resistors and/or silicon controlled rectifier chopping circuits to elaborate, computer controlled, programmable systems for a light level control. It is also known to use photodiodes or other light sensors to measure ambient light level, and to adjust illumination brightness in accordance with the sensed ambient luminance.

However, none of the known systems appear to specifically take into account the adaptation characteristics of the human eye, or to have as a specific objective the tailoring of changes in illumination intensity to the ability of the human eye to respond. The benefits to be gained from controlling changes in illumination intensity to adaptation characteristics of the eye include reducing discomfort when moving from dark to bright areas, reducing impact of transitions from dark to light to dark on darkadapted eyes, and saving energy when increased lighting levels do not improve discrimination.

The applicants have specifically considered the adaptation characteristics of the human eye in devising a unique light control method and apparatus which are based on controlling changes in luminance so that the rate of change tracks adaptability of the human eye to changes in luminance, thus achieving the foregoing benefits. Accordingly, many of the shortcomings of prior variable intensity lighting control systems are avoided.

SUMMARY OF THE INVENTION

The present invention is a lighting control method and apparatus in which, upon a commanded change in illumination intensity, the intensity is changed in accordance with a rate function corresponding to adaptability of the human eye to changes in illumination intensity. The luminance to which the user's eyes were exposed immediately prior to a commanded change may be sensed and used to derive a more precise rate function. In addition, if there is a commanded increase in tensity from a level below the discrimination range of the human eye, the intensity is immediately increased to within the range.

Apparatus for executing the foregoing method includes a function generator which responds to an input commanding a change in illumination intensity by providing a characterized ramp signal to a light controller. Specifically, the ramp signal is characterized to cause the lighting controller to change illumination intensity in accordance with a rate function corresponding to adaptability of the human eye to changes in illumination intensity. The input is provided by command input means which may take a variety of forms ranging from a simple manual switch to a central computer which transmits over a radio frequency or infrared communication link.

DESCRIPTION OF THE PREFERRED EMBODIMENTS

Figure 1:
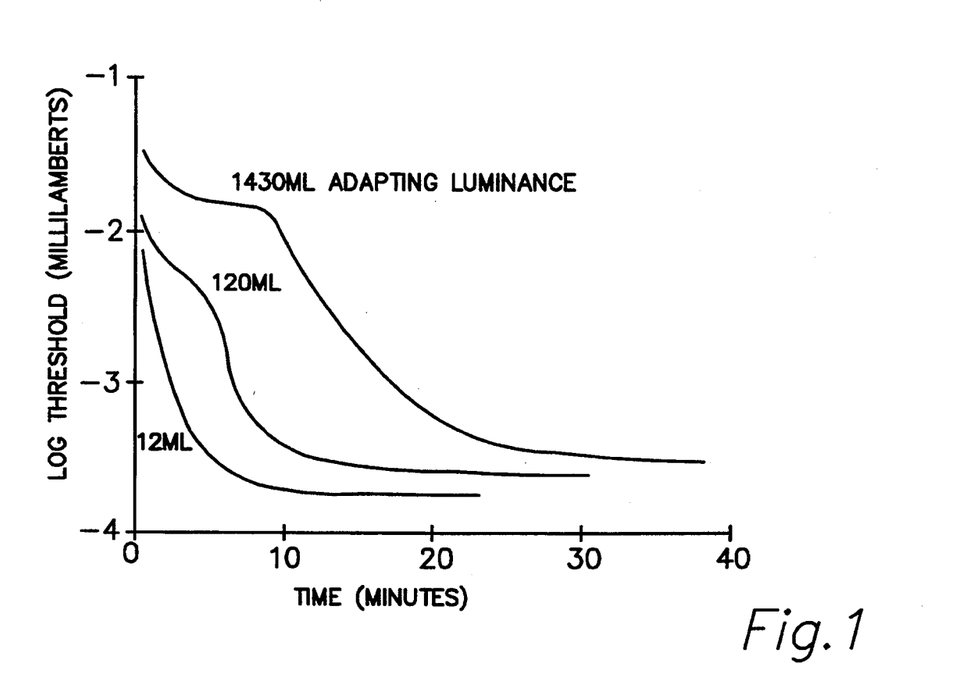
FIG. 1 is a family of curves showin dark adaptation characteristics of the human eye.

As illustrated by the dark adaptation curves of FIG. 1, dark adaptation follows a somewhat complex function. The first stage of the curves represents the rate at which the cone system of the retina adapts to darkness from several representative light intensities. Dark adaptation of the cone system may take in the order of one to five mintes. The discontinuity in the dark adaptation curves represents the point at which the rod mechanism comes into operation. For the rods to be fully dark adapted may take another ten to thirty minutes.

Figure 2:
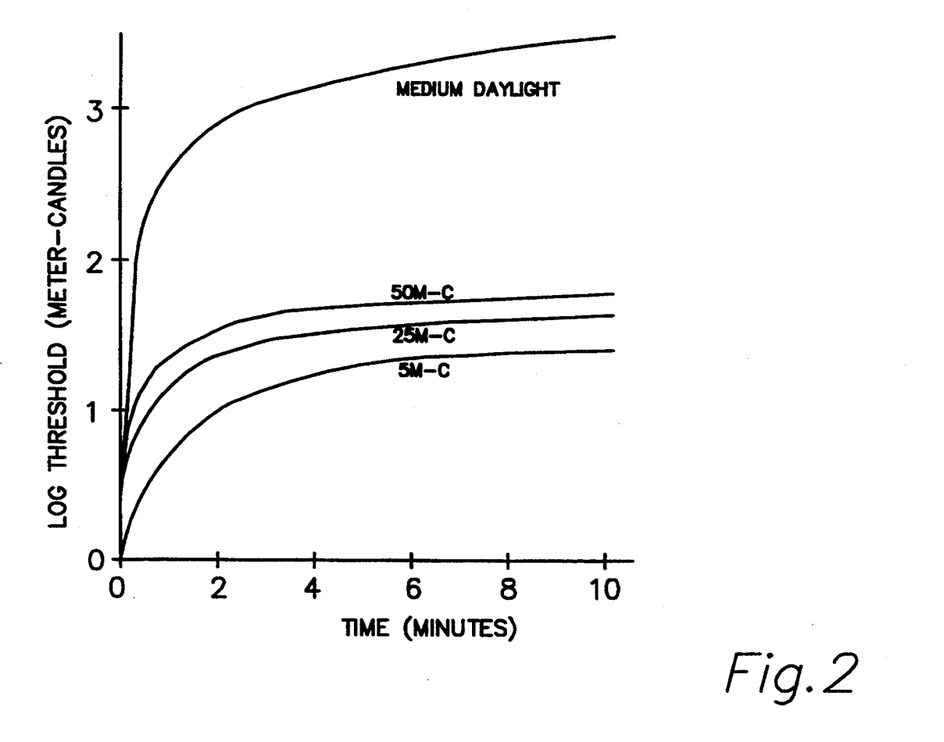
FIG. 2 is a family of curves showing light adaptation characteristics of the human eye.

In contrast, as shown in the curves of FIG. 2, the rate at which the human eye adapts from darkness to increased light intensity, or light adaptation, follows a simpler function and is substantially complete in a much shorter time. Very generally, 80% of the light adaptation occurs within the first thirty seconds.

Figure 3:
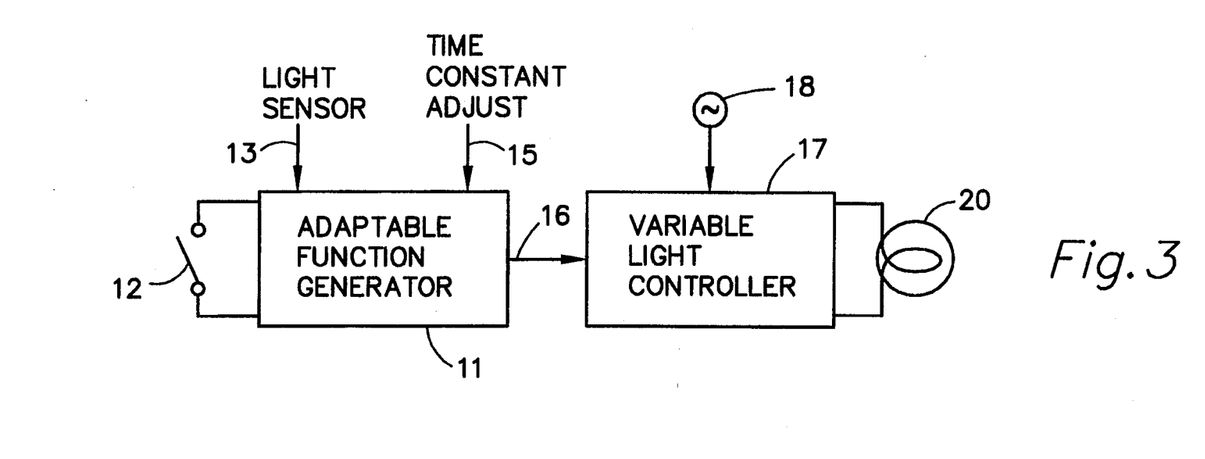
FIG. 3 is a block diagram of a simple lighting controller in accordance with the applicant's invention.
Figure 4:
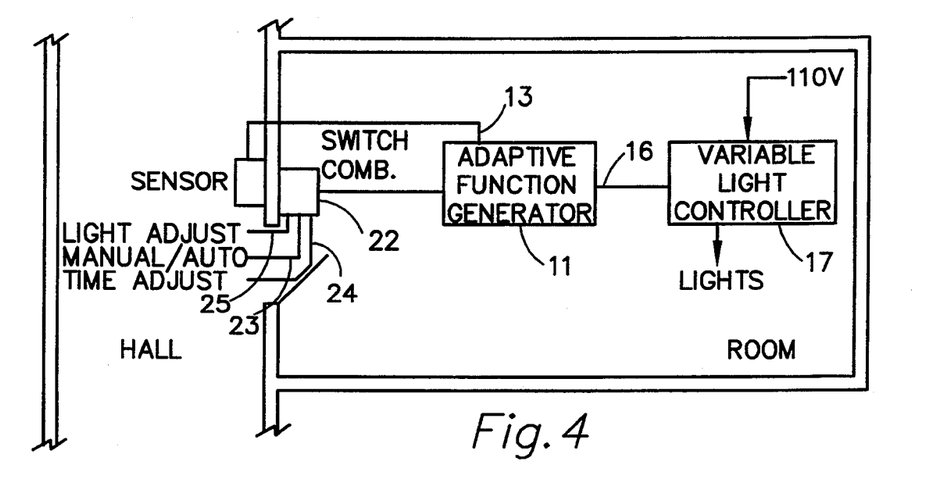
FIG. 4 is a block diagram of a lighting controller similar to that of FIG. 3 shown in a representative installation.
Figure 5:
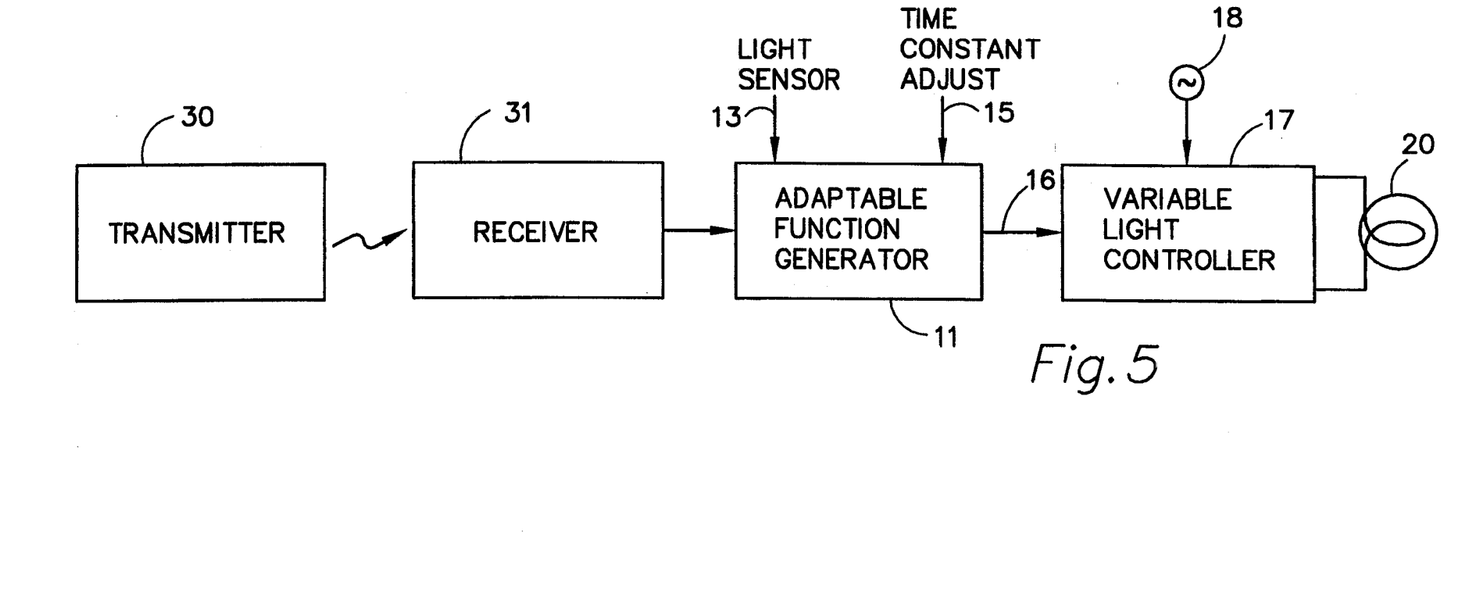
FIG. 5 is a block diagram of a lighting controller in accordance with the applicant's invention in which lighting commands are transmitted over a wireless communication link.

Light control apparatuses or systems which take into account the eye adaptation characteristics illustrated in FIG. 2 and, to a lesser extent, FIG. 1 is shown in block diagram form in FIGS. 3–5. The reason for lesser accommodation of dark adaptation characteristics is that the associated time constants are sufficiently long as to make it unacceptable in many applications to decrease illumination intensity at a pace which would maintain full eye light adaptation.

The simplest emdodiment of such a system is shown in FIG. 3 in which reference numeral 11 identifies an adaptable function generator or processor capable of generating signals corresponding to the families of curves shown in FIGS. 1 and 2 in response to an input command for a change in illumination intensity. As shown in the controller of FIG. 3, the input command is provided by a simple manually actuated light switch 12. Generator 11 also receives an input 13 indicative of illumination intensity to which the eyes of a person occuping the illuminated space were exposed just prior to the commanded change in illumination intensity. The light detector may, for example, be in a hall outside the door to a room in which illumination is being controlled, as shown in the controller of FIG. 4. In another arrangement, the sensor may be located in the room in which illumination is being controlled to provide for increasing the illuminance in the room in accordance with the eye adaptability function when the room light is turned on at night.

In a simple implementation, the eye adaptability function can be approximated by a time constant adjustment.

Adaptable function generator 11 may be provided with such a time constant adjustment at indicated as reference numeral 15.

Generator 11 provides a variable output signal as indicated by reference numeral 16 to a variable light controller 17 which controls energization supplied from a public utility or other suitable source as shown at 18 to one or more electric lights 20.

In operation, as switch 12 is turned on or off, generator 12 produces an output signal in the form of a rate function corresponding to the adaptation curve of the human eye to the luminance indicated by luminance signal 13, and whether the input command is for increased or decreased luminance in the space in which light is being controlled. The output signal is then used by controller 17 to control energization to lights 20 in a corresponding manner.

The light controllers of FIGS. 4 and 5 are illustrated as employing the same adaptable function generator or processor and light controller as in the light control apparatus of FIG. 3. The same reference numerals are applied to these elements in FIGS. 4 and 5 as in FIG. 3. However, in the light controller of FIG. 4 the command input is provided by an occupancy sensor 22 in the space in which light is being controlled. This occupany sensor may be combined with a manually operable switch, a light level sensor and/or a dimmer. Occupancy sensor 22 is shown with an input 23 which provides for manual or automatic operation, and manually operable time constant and light intensity adjustment 24 and 25 respectively.

In the automatic mode, lights 20 will be turned on upon entry of a person into the room. The rate of increase in intensity will track the eye adaptation function produced by generator 11. In the manual mode, it is possible to set the ramp up time and final light intensity as desired by time constant and light intensity adjustments 24 and 25.

The light controller of FIG. 5 is similar to the light controllers of FIGS. 3 and 4 except that the input command is received over a wireless communication link. Reference numerals 30 and 31 identify a transmitter and receiver for achieving the wireless communication. Transmitter 30 is supplied with a desired light intensity command which it transmits to receiver 31. Receiver 31 in turn, supplies a corresponding input to adaptable function generator 11. The wireless communication may be over either a radio frequency or infrared optical link.

Figure 6:
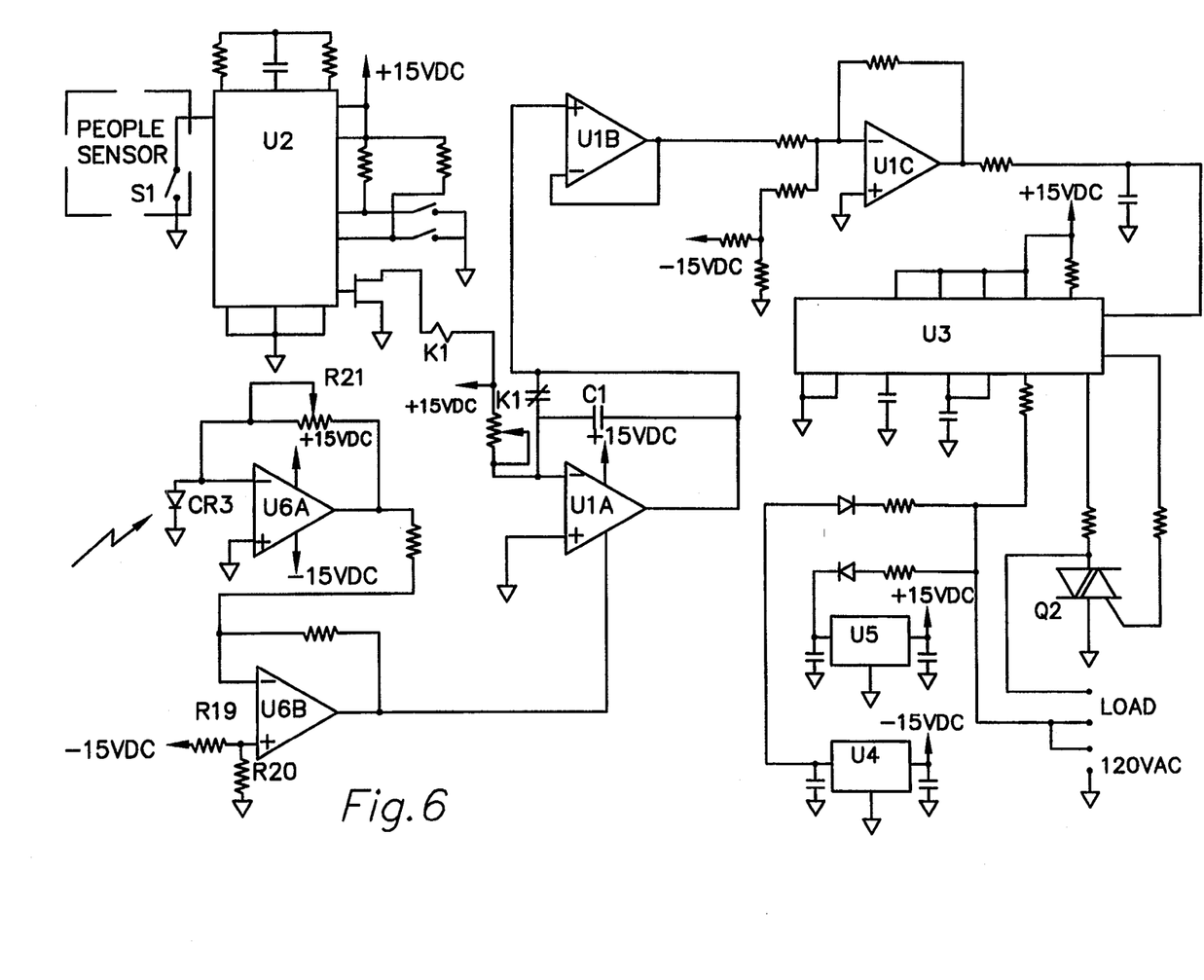
FIG. 6 is a circuit diagram of a simple adaptive function generator or processor suitable for use in the lighting controllers of FIGS. 3–5.

Adaptable function generator or processor 11 in the lighting control apparatus of FIGS. 3–5 may be implemented as shown in the circuit diagram of FIG. 6. The input command is produced by a manually operable switch or occupancy sensor 31 corresponding to 12 or occupancy sensor 22 in FIGS. 3 and 4 respectively. A photodiode CR3 provides an illumination intensity signal corresponding input 13 to that supplied to of adaptable function generator 11 in FIGS. 3–5.

Switch S1, when operated, energizes a relay K1 through a switch debounce circuit formed of an integrated circuit (IC) U2 and associated passive components. When relay coil K1 is energized normally closed contract the relay in a signal integrating circuit, included IC U1A and associated passive components, opens and release the short across a capacitor C1, thus enabling the integrating circuit to function.

At the same time, ambient light level is sensed by photodiode CR3 which converts the light level to a voltage signal. This voltage signal is then amplified by an IC U6A and associated passive components. The amplified voltage signal is then compared to a reference signal by an U6B and its associated passive components.

If the amplified voltage signal representing the light level, exceeds the reference voltage provided by a voltage divider formed of resistors R19 and R20, a negative voltage is applied to the negative power supply terminal of IC U1A IC. U1A is thus turned on and procedes to integrate and develop a voltage ramp. The output ramp voltage is further buffered an IC U1B and inverted as IC U1C.

The resulting inverted and buffered ramp voltage is applied to an IC U3 where it is transformed to an alternating current of variable duty cycle suitable for control an SCR. The resulting chopped alternating voltage is applied to SCR Q2 which allows current to flow from the power supply to the load in proportion to the duty cycle. The power input to the load and therefore light level is proportional to this chopped SCR control signal.

ICs U4 and U5 and their associated passive components shown in FIG. 6, provide regulated ±15 volt DC electrical power to the active components in the circuit.

Figure 7:
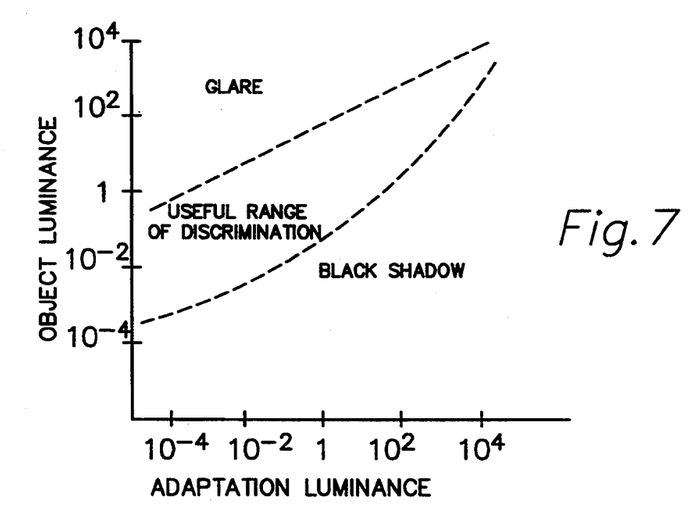
FIG. 7 is a graphical illustration of the useful range of discrimination of the human eye.

FIG. 7 illustrates the range of object luminances within which discrimination is possible for different adaptation luminances. The limit lines shown are not sharp boundaries. Glare and loss of highlight detail gradually increase as luminance increases, loss of shadow detail gradually merges into subjective black as luminance decreases.

Figure 8A:
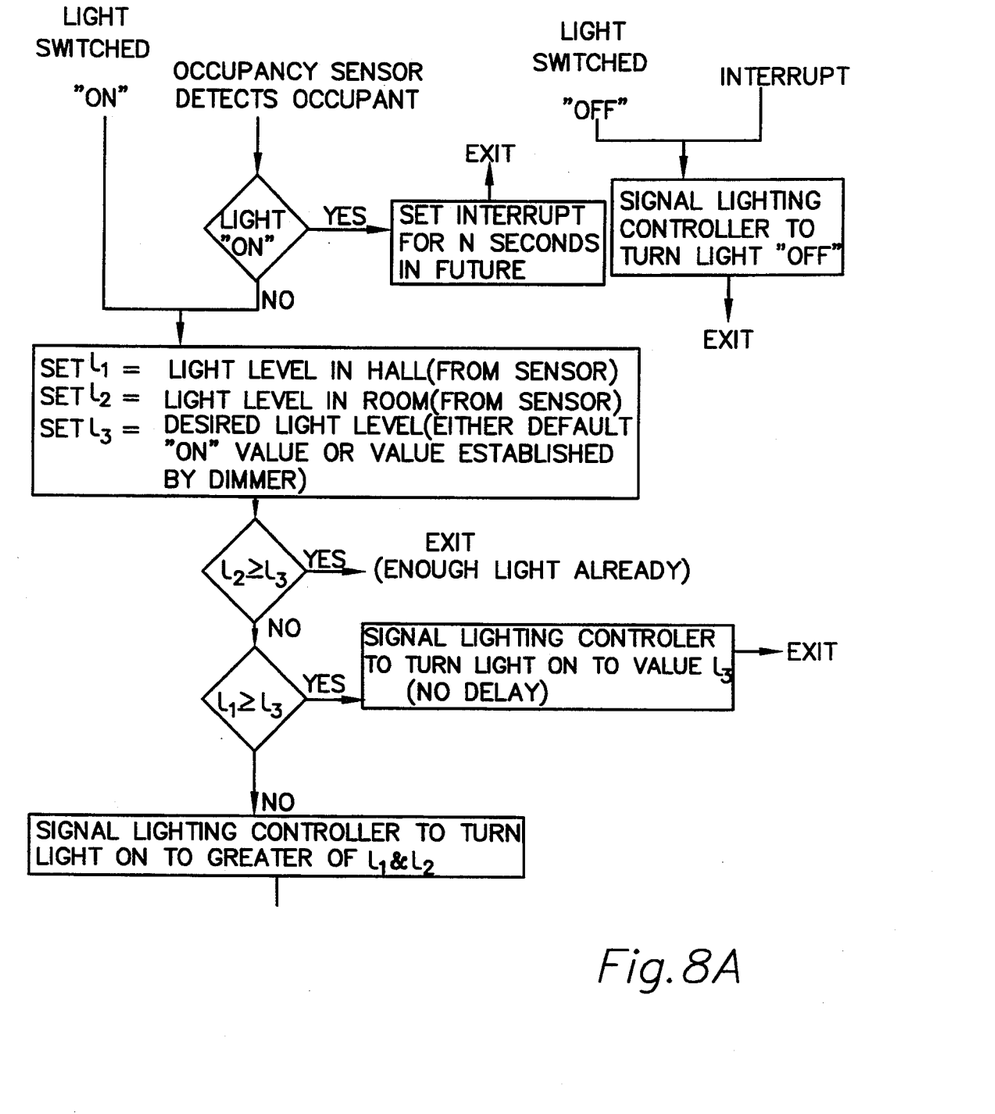
FIGS. 8a and 8b together are a logic diagram usable in the adaptive function generator or processor of the lighting controllers of FIGS. 3–5 for implementing a lighting control function which takes into account the useful discrimination range of the human eye illustrated in FIG. 7.
Figure 8B:
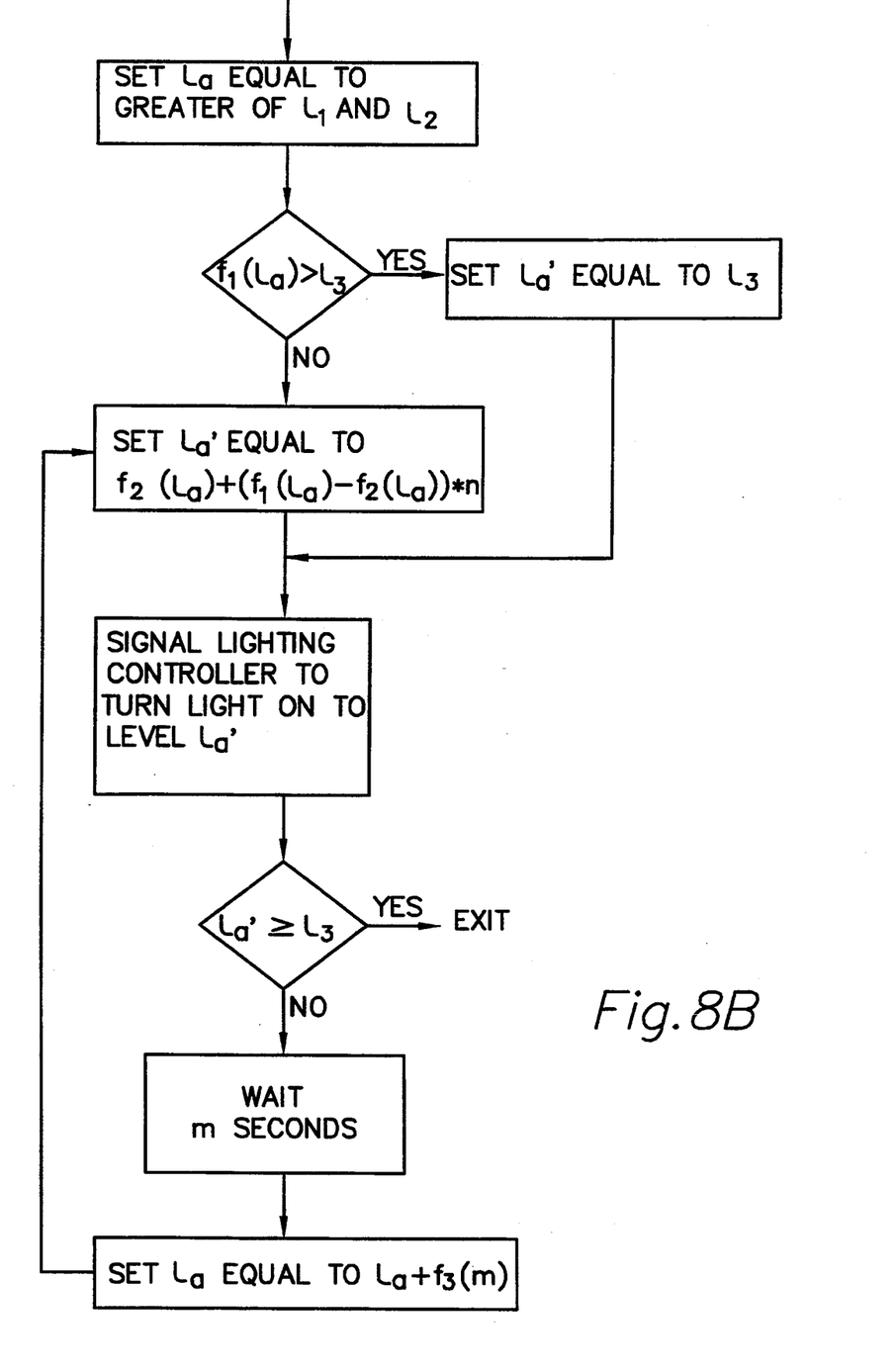

Nevertheless, this characteristic can be utilized to produce a more advanced lighting controller than those to which FIGS. 1–6 relate. In such a controller, if the eyes are already somewhat light adapted when a command is given to switch on a light in a room, the controller will immediately increase light intensity to within the useful discrimination range, rather than gradually increasing intensity from a level too low to permit optimum seeing, The illustrated characteristic also can be utilized to provide for continuing increases in light intensity as light adaptation of the eyes increases. FIGS 8a and 8b, which will be further described hereinafter, illustrate a logic program which utilizes the characteristics illustrated in FIG. 7 to accomplish the foregoing operation.

The upper and lower boundaries of the useful discrimination range can be represented by respective functions $$f_1(l) = 1.45 + 0.45l; \text{ and}$$

$$f_2(l) = -1.598 + 0.66l + 0.071l^2$$

A further function useful for performing the logic program of FIGS. 8a and 8b is $$f_3(m) = 0.355 + 0.672m - 0.115m^2 + 0.006m^3$$

where:

$0 < n < 1$ and the value of n is selected emperically to compensate for uncertainty in the data on which FIG. 8 is based.

$0 < m < 30$, m being the number of seconds the light level is held constant before moving to a higher level. This value is somewhat application dependent and impacts whether the system provides what appears to be a continuous increase in light level or a step increase. Typical values would range from 1 to 10 seconds. As apparent from FIG. 3' there is no sigificant change in light adaptation for time values over 30 seconds.

$f_1(l)$ is a function calculating maximum acceptable lighting level for a given level of eye adaptation.

$f_2(l)$ is a function calculating where the ability to discriminate is degraded for a given level of eye adaptation $f_3(m)$ is a function calculating how much the eye has adapted in time period m.

The embodiments of the invention in which an exclusive property or right is claimed are defined as follows:

1. Apparatus for controlling luminance in a space, the luminance being produced by a variable light source, comprising:

command means for receiving input commands indicative of changes in desired luminance in a first space; and control means responsive to the input commands received by said command means for controlling a variable light source in the first space so that the luminance produced thereby changes in accordance with a rate function corresponding to adaptability of the human eye to changes in luminance.

2. The apparatus of claim 1 wherein said control means includes:

a controller for supplying variable energization to the light source in response to a variable input signal; and a function generator responsive to input commands received by said command means for supplying the variable input signal to said controller, the variable input signal corresponding to a function which tracks the rate at which the human eye adapts to changes in luminance.

3. The apparatus of claim 2 wherein said function generator includes a luminance signal input for accepting a signal indicative of the luminance to which the eye of a person occupying the first space was exposed just prior to a commanded change in luminance in the first space, the signal supplied by said function generator corresponding to the luminance adaptability function of the human eye for the luminance indicated by a signal supplied to the luminance signal input.

4. The apparatus of claim 3 further including a first luminance sensor connected to supply a first luminance signal to the lumniance signal input of said function generator, the first luminance sensor being adapted to sense the luminance in a second space from which the person occupying the first space entered the first space.

5. The apparatus of claim 4 wherein:

a second luminance sensor is included, the second luminance sensor being adapted to sense the luminance in the first space and supply a second luminance signal to said function generator; and said function generator, in response to an input command to increase the luminance in the first space from a value below the discrimination range of the human eye, immediately causes said controller to increase the luminance in the first space to within said discrimination range.

6. The apparatus of claim 5 wherein the discrimination range is substantially bounded by the functions $f_1(l) = 1.45 + 0.451l$ and $f_2(l) = -1.598 + 0.66l + 0.071l^2$, where l is the luminance to which the eye of the person occupying the first space was exposed just prior to the commanded increase in luminance in the first space.

7. The apparatus of claim 3 wherein said command means includes a manually operated switch.

8. The apparatus of claim 3 wherein said command means includes an occupancy sensor in the first space.

9. The apparatus of claim 3 wherein said command means includes an infrared optical communications link.

10. The apparatus of claim 3 wherein said command means includes a radio frequency communications link.

11. A method of controlling the intensity of illumination in a space, comprising the step of, upon a commanded change in intensity, changing the intensity in accordance with a rate function corresponding to adaptability of the human eye to changes in illumination intensity.

12. The method of claim 11 including the steps of:
establishing as a first intensity value, the illumination intensity to which a human eye is exposed just prior to a change in illumination intensity in the space;
establishing as a second intensity value, the desired final illumination intensity in the space;
generating a function representative of the rate at which the human eye adapts to changes in illumination intensity; and
changing the illumination intensity in the space at a rate corresponding to said function for at least a portion of the function bounded by the first and second intensity values.

13. The method of claim 12 including the further step of, upon a commanded increase in illumination intensity in the space from an intensity below the useful discrimination range for the human eye, immediately increasing the intensity to within said useful discrimination range.

14. The method of claim 13 wherein the discrimination range is defined as substantially bounded by the functions $f_1(l) = 1.45 + 0.451l$ and $f_2(l) + -1.598 + 0.66l + 0.071l^2$, where l is the luminance to which the human eye was exposed just prior to the commanded increase in illumination intensity in the space.

15. A lighting control system for controlling a variable light source in a first space which a user can enter from a second space, the lighting control system comprising:
a light controller for varying the energization supplied to the variable light source in response control signals supplied thereto;
a first luminance sensor adapted to produce a first luminance signal indicative of luminance in the second space;
command input means adapted to produce an input command signal indicative of finally desired luminance in the first space; and
an adaptive control processor connected to receive the first luminance signal and the input command signal from said first luminance sensor and said command input means, and connected to supply control signals to said light controller, said adaptive control processor being adapted to respond to the input command signal by generating a control signal adapted to cause the luminance in the first space to change to the finally desired luminance in accordance with a rate function corresponding to adaptability of the human eye to changes in luminance.

16. The lighting control system of claim 15 wherein, if the luminance in the first space just prior to a commanded change in luminance is below the useful discrimination range of the human eye, said adaptive control processor, upon receiving an input command signal to increase the luminance in the first space, substantially immediately generates a control signal adapted to cause the luminance in the first space to increase to within said useful discrimination range.

17. The lighting control system of claim 16 wherein said useful discrimination range is determined from the luminance in the second space, as sensed by said first luminance sensor just before a commanded change in luminance in the first space.

18. The lighting control system of claim 17 wherein said adaptive control processor determines the useful discrimination range as lying substantially between functions $f_1(l) = 1.45 + 0.451l$ and $f_2(l) = -1.598 + 0.66l + 0.071l^2$, where l is the luminance in the second space just prior to the commanded change in luminance in the first space.

* * * * *